United States Patent [19]

Fujimoto

[11] Patent Number: 5,717,447
[45] Date of Patent: Feb. 10, 1998

[54] METHOD OF DRIVING INK JET PRINTING HEAD

[75] Inventor: Hisayoshi Fujimoto, Kyoto, Japan

[73] Assignee: Rohm Co., Ltd., Kyoto, Japan

[21] Appl. No.: 925,975

[22] Filed: Aug. 5, 1992

[30] Foreign Application Priority Data

Aug. 19, 1991 [JP] Japan ................... 3-206787
Apr. 17, 1992 [JP] Japan ................... 4-097881
Apr. 30, 1992 [JP] Japan ................... 4-110580

[51] Int. Cl.$^6$ ................... G02D 15/18; B41J 2/01
[52] U.S. Cl. ................... 347/37; 347/41
[58] Field of Search ................... 346/140 R; 400/323; 347/9, 12, 37, 41

[56] References Cited

U.S. PATENT DOCUMENTS 4,401,991  8/1983  Martin ................... 346/75
4,622,560  11/1986  Withoos et al. ................... 346/1.1

FOREIGN PATENT DOCUMENTS 0023433  2/1981  European Pat. Off. .
0471488  2/1992  European Pat. Off. .

OTHER PUBLICATIONS

IBM Technical Disclosure Bulletin, vol. 33, No. 10B, Mar. 1991.

*Primary Examiner*—Benjamin R. Fuller
*Assistant Examiner*—Craig A. Hallacher
*Attorney, Agent, or Firm*—Wolf, Greenfield & Sacks, P.C.

[57] ABSTRACT

An ink jet printing head. The printing head is moved along a printing line by the amount corresponding to the number of dots which are assigned to each nozzle, and thereafter the head is moved in the direction orthogonal to the printing line. After these movements are repeated a predetermined number of times, the head is moved in the opposite direction to the printing line by the amount corresponding to the number of dots which are assigned to each nozzle, and thereafter the head is moved in the direction orthogonal to the printing line.

9 Claims, 5 Drawing Sheets

METHOD OF DRIVING INK JET PRINTING HEAD

BACKGROUND OF THE INVENTION

1. Field of the Invention

The present invention relates to a method of driving an ink jet printing head which is mounted in a printer, word processor, facsimile machine, plotter or the like.

2. Description of the Related Art

Referring first to FIG. 3, a method generally used to drive a thermal printing head having a comparatively low printing density is applied to an ink jet printing head without any modification. FIG. 3 schematically shows the positions of the dots which are printed through twelve (A to L) nozzles 11 provided on an ink jet printing head 10 for printing at a density of 8 dots per mm through two nozzles per mm. The dots A to L respectively correspond to the nozzles A to L. In this example, 4 dots are assigned to each nozzle 11. The movement of the nozzle A in the printing operation on each line on printing paper will now be explained. In printing on a first line, the head 10 is first moved dot by dot in the direction of printing (toward the right in FIG. 3) from the printing starting point (the left end in FIG. 3) by the amount corresponding to 4 dots. Printing is carried out by jetting ink from the nozzles 11 in accordance with printing information. At the point of time when printing on the first line is finished, the head 10 is situated at the position which is shifted from the original position to the right by the amount corresponding to 4 dots (in other words at the fifth dot from the original one).

After feeding the paper upward by the amount corresponding to one printing line, printing on the next line is carried out while moving the head 10 dot by dot in the opposite direction to the direction of printing on the first line by the amount corresponding to 4 dots. At the point of time when printing on the second line is finished, the head 10 is returned to the printing starting position. In this way, the head 10 is shuttled on each pair of lines.

If it is assumed that the time for printing on one line is 5 ms in the printing operation shown in FIG. 3, the time T' required for shuttling the head 10 once (hereinunder also referred to as "shuttling period") is 10 ms, and the shuttling frequency is 100 Hz.

FIGS. 4 to 6 show an example of the structure of an apparatus which is capable of realizing such a driving method. By turning a feed screw 102 by means of a motor 100 in FIG. 4, it is possible to move a carriage 104 provided on the feed screw 102 in the right and left directions. If the head 10 for jetting ink is fixed to the carriage 104, the shuttling operation shown in FIG. 3 can be realized by controlling the motor 100.

FIGS. 5 and 6 show an example of a circuit for controlling the operation of jetting ink from the nozzles 11 of the head 10. Serial printing data DIN is first input to a shift register 106 in synchronism with a clock pulse CP so as to convert the serial data DIN into parallel data. A latch 108 latches the parallel data in accordance with a latch signal LA. When the latched data is supplied to a push-pull driver 110, the driver 110 causes the head 10 to jet ink while a strobe signal STR is ON. If the head 10 is composed of a piezoelectric element 112, the driver 110 causes the piezoelectric element 112 to charge or discharge through a charging/discharging circuit 114. The symbol VH represents the driving voltage of the piezoelectric element 112, and $VH_{GND}$ the grounding plane thereof. A signal such as the strobe signal STR is supplied to the circuit shown in FIG. 5 through a CPU 116 shown in FIG. 6. The CPU 116 also controls a paper feeding motor (not shown).

In the case of applying a method of driving a thermal printing head having a comparatively low printing density to an ink jet printing head without any modification in this way, a number of problems arise. Namely, in the case of operating an ink jet printing head at the above-described shuttling period and shuttling frequency, since the shuttling period is too short and the shuttling frequency is too high for the ink jet printing head, the printing operation is disturbed due to vibration during printing and an ink jetting error is caused due to bubbles mixed with the ink.

In addition, since the time between the end of printing on one line and the commencement of printing on the next line, namely, the time required for paper feeding is generally longer than the ink jetting period (which corresponds to the period in which the ink adheres to the paper), the speed at which the carriage 104 (head 10) moves is not constant, so that the operation of the carriage 104 is not smooth, which has a detrimental effect on the printing quality.

SUMMARY OF THE INVENTION

Accordingly, it is an object of the present invention to eliminate the above-described problems in the related art and to provide a method of driving an ink jet printing head which enables printing at a high density with a smooth shuttling movement without any problems such as the disturbance of the printing operation and ink jetting errors due to bubbles mixed with the ink, by using a head having a comparatively low printing density, which is cheaper and is produced at a higher productivity than a printing head having a high printing density.

To achieve this aim, the present invention provides a method of driving an ink jet printing head comprising the steps of: (a) printing on one line on paper while moving a printing head dot by dot in one horizontal direction by the amount corresponding to the dots assigned to each nozzle; (b) repeating the step (a) at least once; (c) printing on one line on paper while moving the printing head dot by dot in the opposite direction to the direction at the step (a) by the same amount as at the step (a); (d) repeating the step (c) the same number of times as at the step (b); and (e) finishing the shuttling movement of the printing head when the printing head is returned to the printing starting point.

According to this driving method, the shuttling period in which the printing head shuttles is longer and, hence, the shuttling frequency becomes lower than in the above-described conventional driving method. More specifically, in the driving method which is generally applied to a thermal printing head having a comparatively low printing density, the printing head shuttles while printing on 2 lines. In contrast, in the driving method of the present invention, the printing head shuttles while printing on at least 4 lines (2 lines in one horizontal direction, and 2 lines in the other horizontal direction), so that the shuttling movement of the printing head is slower by that degree. This fact solves the problems such as the disturbance of the printing operation and an ink jetting error due to bubbles mixed with the ink.

Furthermore, if the paper feeding operation is initiated immediately after the ink adheres to the printing paper, and it is finished in a shorter time than the ink jetting period, it is not necessary to put a special interval between the end of printing on one line and the commencement of printing on the next line, which leads to a smooth shuttling movement.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 5:
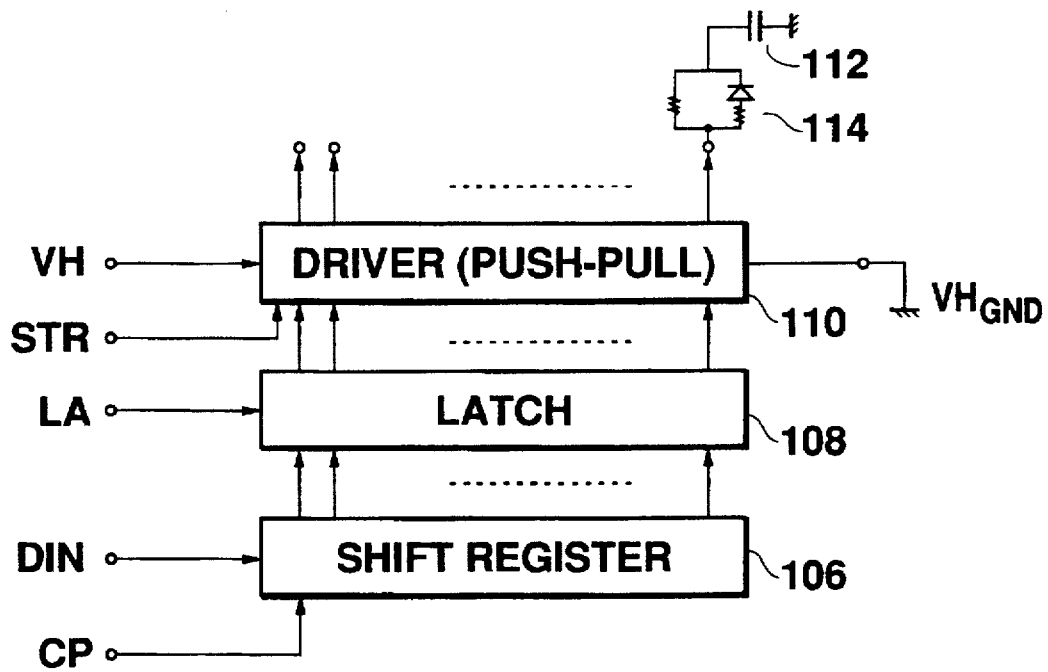
FIG. 5 is a block diagram of the structure of an ink jetting control circuit.

Preferred embodiments of a method of driving an ink jet printing head according to the present invention will be explained hereinunder. Since the structure of the printing head itself is the same as a conventional one, explanation thereof will be omitted. The structure of the control circuit is also the same as that shown in FIGS. 5 and 6.

Figure 1:
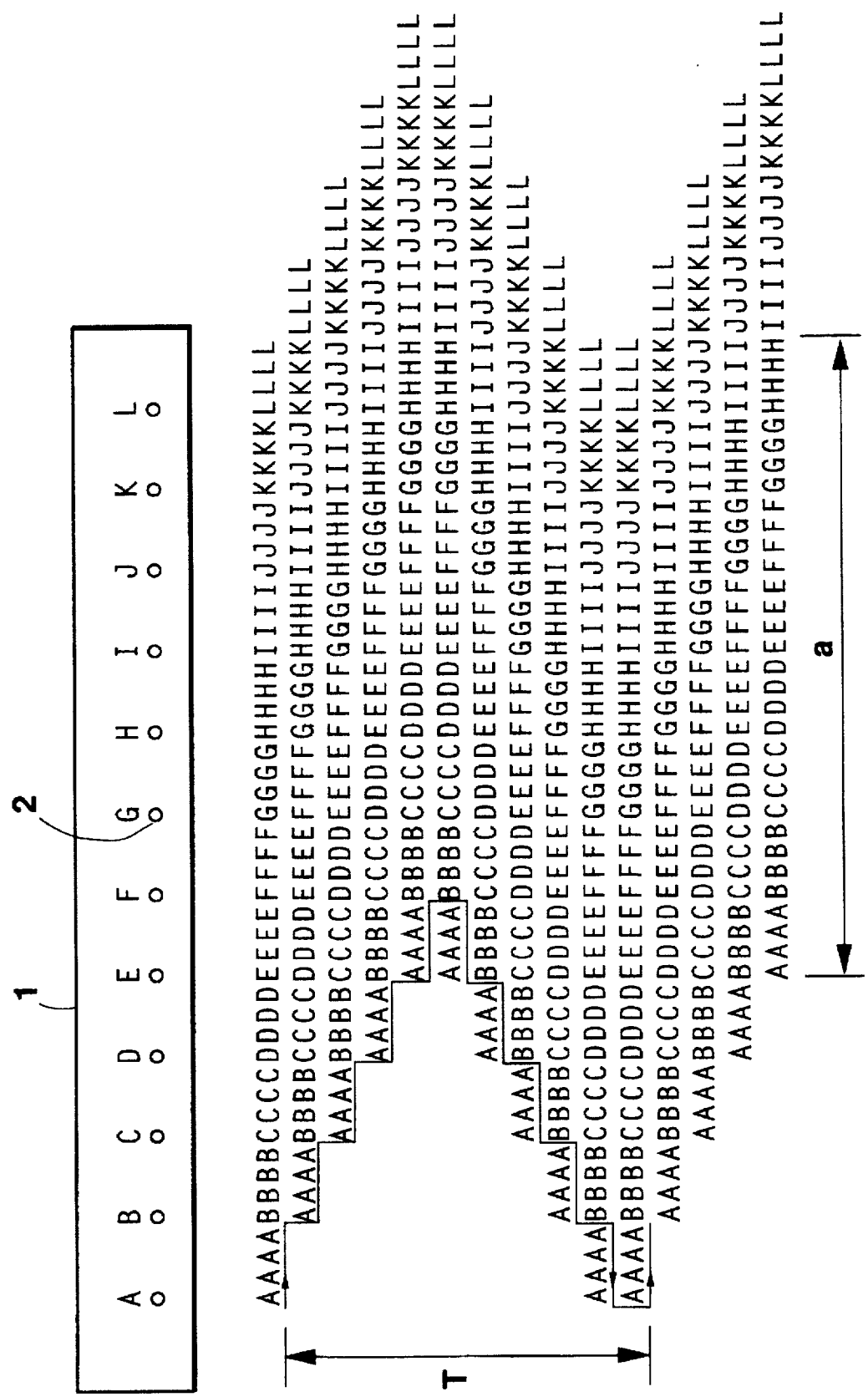
FIG. 1 schematically shows a printing head and its printing operation thereby to explain a driving method according to the present invention.
Figure 3:
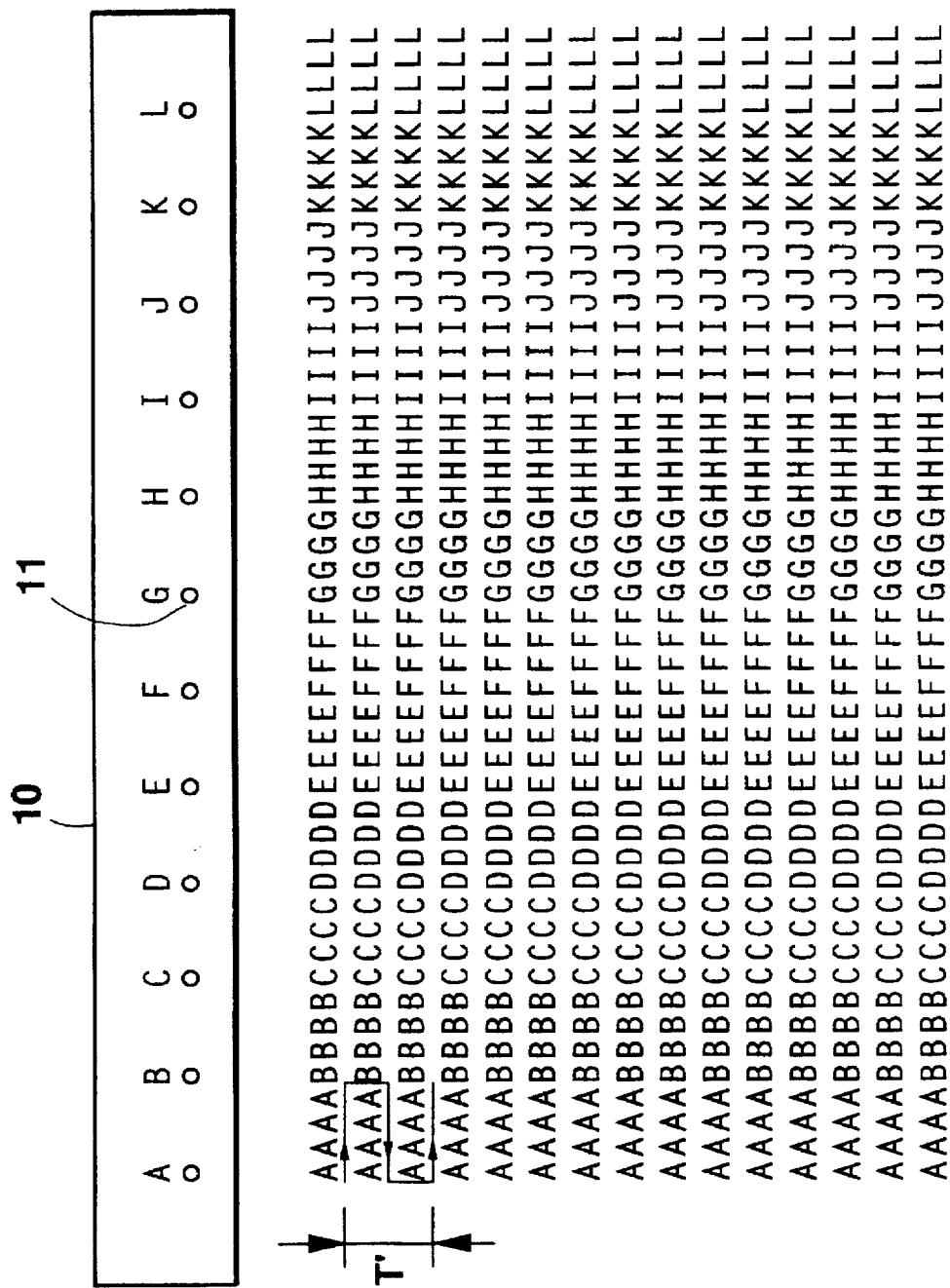
FIG. 3 schematically shows a printing head and its printing operation to explain the case in which a driving method generally used to drive a thermal printing head is applied to an ink jet printing head.
Figure 4:
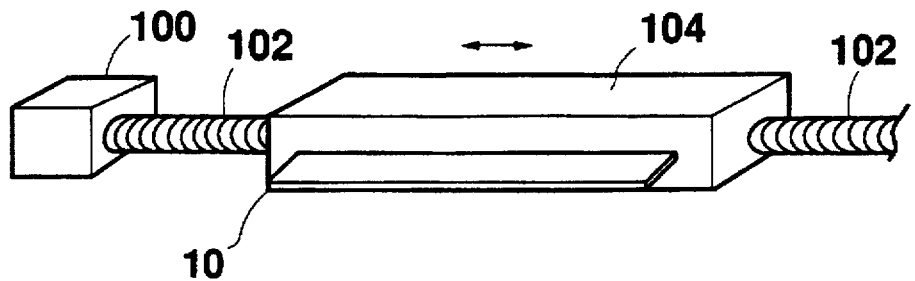
FIG. 4 is a perspective view of a partial structure of an ink jet printer which can realize the method shown in FIGS. 1 or 3.

FIG. 1 schematically shows the dots which are printed through twelve (A to L) nozzles 2 provided on an ink jet printing head 1. The dots A to L respectively correspond to the nozzles A to L. In this embodiment, 4 dots are assigned to each nozzle 2, and the head 1 shuttles while printing on 10 lines, as is obvious from FIG. 1. If it is assumed that the time for printing on one line is 5 ms as in the conventional driving method shown in FIG. 3, the time T required for shuttling the head 1 once, namely, the shuttling period T, is 50 ms, and the shuttling frequency is thus 20 Hz. That is, the shuttling period is considerably longer and the shuttling frequency is much lower than in the conventional method of driving a thermal printing head.

The printing operation of the printing head 1 will now be explained. If it is assumed that the effective printing width a when the head 1 is situated at the printing starting point (the left end in FIG. 1) corresponds to the length between the nozzle E and the nozzle L, the head 1 is first moved on a first line one dot at a time in the direction of printing (toward the right in FIG. 1) from the printing starting point by the amount corresponding to 4 dots. At this time, printing is carried out by jetting ink from the eight nozzles (the nozzles E to L) in accordance with printing information. In other words, the first character being printed on the first line is assigned to the nozzle E, and the last character being printed is assigned to the nozzle L. At the point of time when printing on the first line is finished, the head 1 is situated at the position which is shifted from the original position to the right by the amount corresponding to 4 dots (in other words at the fifth dot from the printing starting point).

In printing on the second line, after the paper is fed upward by the amount corresponding to one printing line, printing is carried out in accordance with printing information while the head 1 is moved similarly on the second line one dot at a time toward the right by the amount corresponding to 4 dots. Printing is carried out through the nozzles D to K, and the other nozzles are not used during the printing operation. At the point of time when printing on the second line is finished, the head 1 is situated at the position which is shifted from the original position to the right by the amount corresponding to 8 dots (in other words at the ninth dot from the printing starting point).

This printing operation is repeated until the fifth line. As a result, printing on the fifth line is carried out through the nozzles A to H. When printing on the fifth line is finished and the paper is fed upward by the amount corresponding to one printing line, printing on the sixth line is carried out while moving the head 1 in the opposite direction (toward the left in FIG. 1) one dot at a time by the amount corresponding to 4 dots. This printing operation is repeated until the tenth line, when the head 1 is returned to the printing starting point at the left end. In this way, the head 1 only shuttles once while printing on the first to tenth lines, and the time required for one shuttling movement is the shuttling period T.

This printing operation is repeated in printing on the eleventh and subsequent lines. In the case of executing the driving method of the present invention, it is necessary to prolong the length of the head 1 by the amount corresponding to 4 dots×(5−1)=16 dots in this embodiment, for example. That is, if the printing density is 8 dots/mm, the head 1 becomes longer by about 2 mm than the conventional head 10. However, the advantages of the driving method of the present invention more than make up for such a problem of increase in length of the head 1. It is considerably easy to match the printing position with the printing information in the printing operation by means of hardware or software, as will be described later.

Another embodiment of the present invention will be explained. In the case of shuttling the head 1 once while printing on 100 lines in FIG. 1, if it is assumed that the time for printing on one line is 5 ms, the time T required for shuttling the head 1 once, namely, the shuttling period T, is 500 ms, and the shuttling frequency is 2 Hz. Consequently, not only does the shuttling period become greatly longer than in the conventional method of driving a thermal printing head, but also the shuttling frequency falls greatly below the lower limit (about 20 Hz) of the audible range, so that it is possible to greatly reduce the noise caused by the printing operation. In this case, it is necessary to prolong the length of the head 1 by the amount corresponding to 4 dots×(50−1)=196 dots, namely, 196÷8=24.5 (mm) if the head 1 has a printing density of 8 dots/mm. The increase in length of the head 1, however, produces no serious problem, as described above.

According to the present invention, since the vibration caused during the printing operation is decreased, it is possible to eliminate the problems such as the disturbance of the printing operation and an ink jetting error due to bubbles mixed with the ink. In addition, even if the nozzle 2 is clogged, the dot omission (blank portion) is inconspicuous. This is obvious if the driving method of the present invention shown in FIG. 1 is compared with the conventional driving method shown in FIG. 3. For example, if the nozzle G is clogged, dot omissions are caused in the entire part of the column corresponding to the 4 dots which are assigned to the nozzle G in FIG. 3, so that the blank portion is conspicuous. In contrast, since the printing position through the nozzle G shifts horizontally on each line in FIG. 1, the blank portions are scattered unlike the one large blank portion shown in FIG. 3, so that the dot omissions become inconspicuous.

Figure 2:
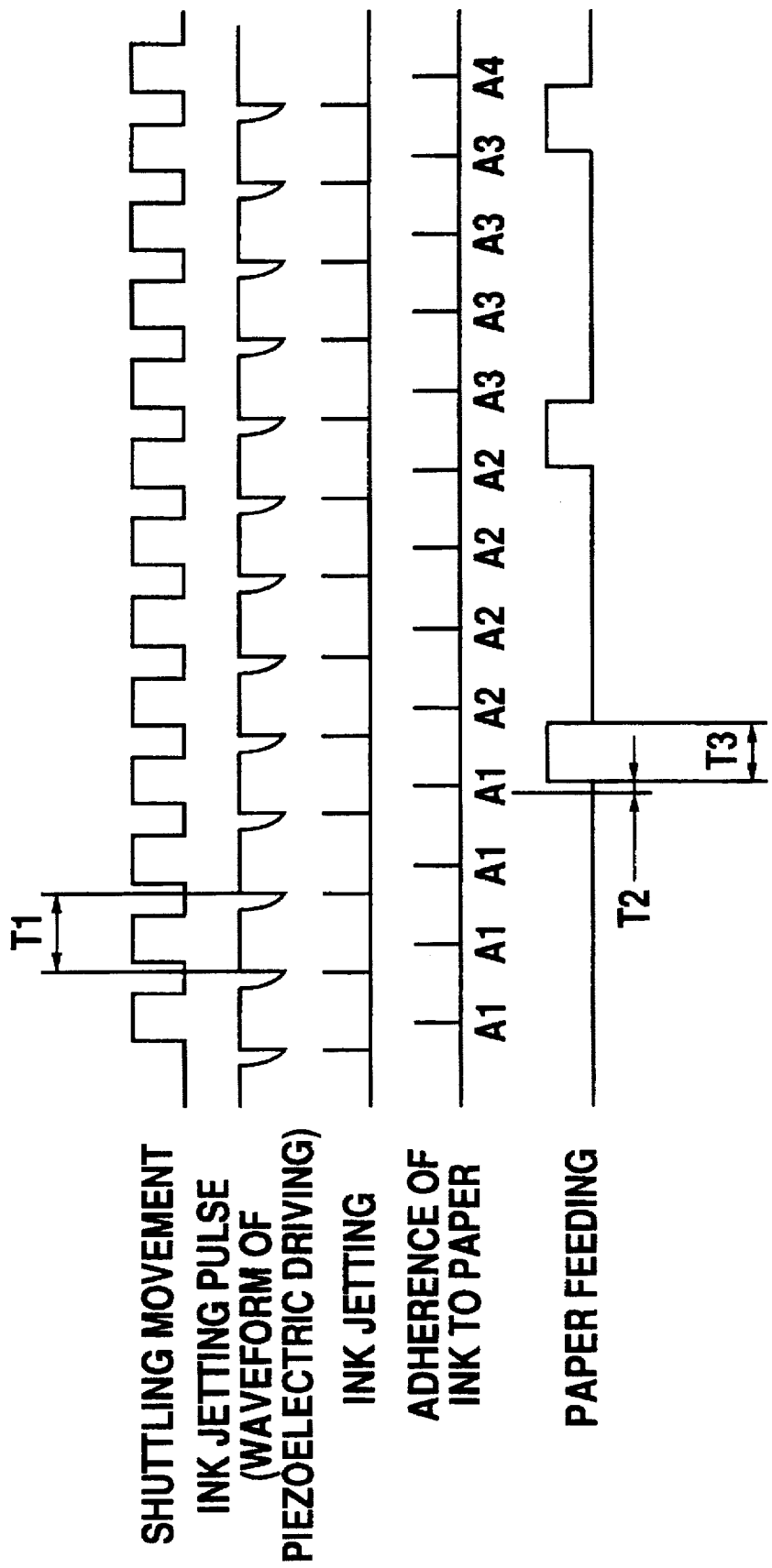
FIG. 2 is a timing chart for shuttling movement, ink jetting pulse, adherence of the ink to the paper, and paper feeding operation.

FIG. 2 is a timing chart for shuttling movement, ink jetting pulse, adherence of ink to paper and paper feeding operation. As described above, in the driving method of the present invention, in order to perform a smooth shuttling movement, it is important to initiate the paper feeding operation immediately after the ink adheres to the printing paper, and to finish it in a shorter time than the ink jetting period. This is expressed by the following formulas (1) and (2):

$$T2>0 \qquad (1)$$

$$T3<T1(T3 \leq T1-T2) \qquad (2)$$

wherein T1 represents the ink jetting pulse, T2 the period between the adherence of the ink to the paper and the commencement of the paper feeding operation, and T3 the time required for paper feeding. In FIG. 2, the adherence of the ink to the paper only through the nozzle A is shown for the sake of convenience, and A1 represents the adherence of the ink to the paper on a first line, A2 that on the second line, and A3 and A4 similarly represent the adherence of the ink to the paper on the third and fourth lines, respectively.

To state this in more detail, the ink jetting period and the ink adhering period are both equal to the ink jetting period, as is obvious from FIG. 2, and the ink is jetted after the addition of an ink jetting pulse, but the ink adheres to the paper after a predetermined time. This is because there is a distance between the nozzle 2 and the printing paper. The time T2 after printing 4 dots through the nozzle A on the first line (A1), the paper feeding operation is initiated and it is continued for the time T3. In the timing chart shown in FIG. 2, the first ink jetting operation on the next line is carried out during the paper feeding operation, but since the paper feeding operation is finished before the ink adheres to the paper on the next line, it causes no inconvenience. Immediately after line feeding, printing on the next line is carried out.

The paper feed timing is set by obtaining the time required for the ink to adhere to the paper from the distance between the nozzle and the paper on the basis of the ink jetting speed so that the paper feeding operation is finished before the ink adheres to the next line. The thus-set timing is incorporated into a program which is stored in advance in a circuit (e.g., the CPU 116) of the printing head, and when the ink jetting speed or the distance between the nozzle and the paper is changed, the value is changed as occasion demands. In this way, by adding the above conditions (1) and (2) to the driving method of the present invention, the (head 1) shuttling speed is kept constant throughout the one-line printing operation and the line feeding operation, thereby making the shuttling movement smooth and, hence, improving the printing quality.

The ink jetting timing shown in FIG. 2 is supplied, for example, from the CPU 116 provided to the driver 110 as the strobe signal STR. The waveform of the ink jetting pulse in FIG. 2 is a waveform of the voltage at both ends of the piezoelectric element 112. The paper feeding timing in FIG. 2 is supplied from the CPU 116.

Figure 6:
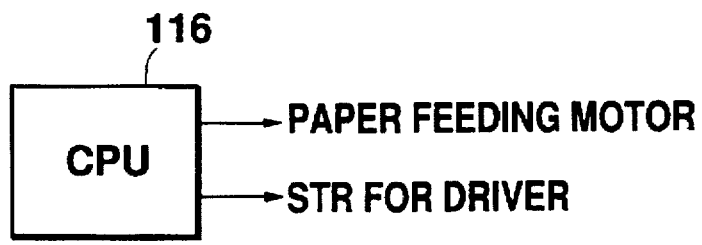
FIG. 6 is a block diagram of a CPU for controlling the circuit shown in FIG. 5.
Figure 7:
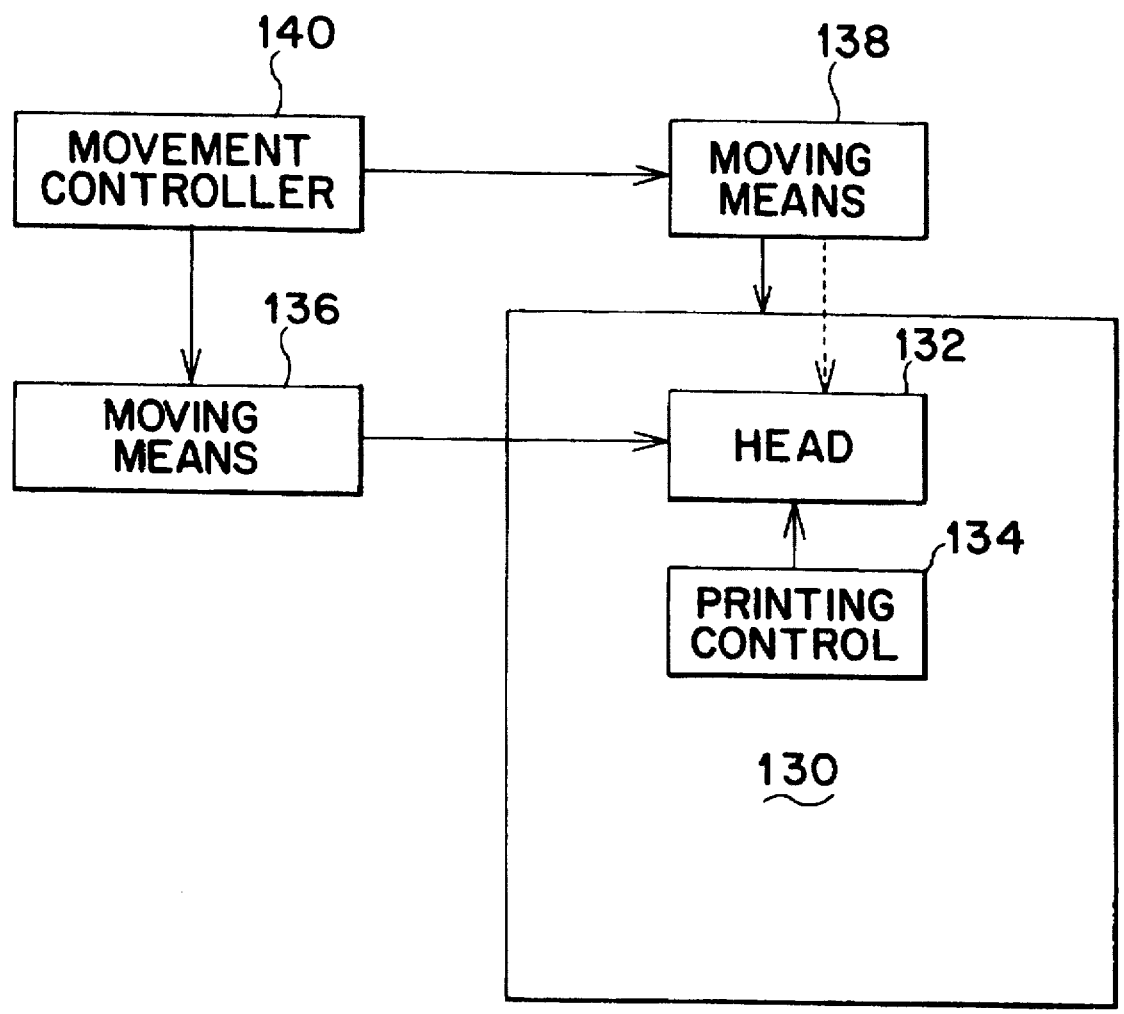
FIG. 7 is a block diagram of an apparatus according to the present invention.

An apparatus for printing on medium 130 is shown in block diagram form in FIG. 7. Head 132 has nozzles (not shown), each of which is assigned to print a number of dots by jetting ink as indicated by FIG. 1. The jetting of ink is controlled by printing control 134 which allows the head to print while it is being moved. First moving means 136 moves the printhead in a direction along a printing line on medium 130. A second moving means 138 moves the head in a direction orthogonal to the direction of the print line. Since the movement is relative, it can be accomplished by either moving the head while keeping the medium in a fixed position, or by moving the medium as indicated in FIG. 6 in which CPU is coupled to a paper feeding motor. The first and second moving means 136, 138 are controlled by a movement controller 140 which performs several functions, each of which are represented by a single moving control in FIG. 7. First, movement control 140 alternatively repeats the movement of moving means 136 and moving means 138 for a predetermined number of times. The controller further provides for reversing the direction of movement by the first moving means after a repetition of movements. Third, the controller controls timing so that it executes movement by moving means 138 at a time when movement by the first moving means 136 is finished, and after a time required for ink to adhere to medium 130 as elapsed. As noted above, the period for reversing the direction of movement by the first moving means is longer than an upper limit of the period of audible sound which, as noted above, is about 50 ms, which is a frequency of about 20 Hz.

The method of driving an ink jet printing head having the above-described structure has the following advantages.

(1) Since the shuttling period is long and the shuttling frequency is low, the vibration during the printing operation is decreased, so that the problems such as the disturbance of the printing operation and an ink jetting error due to bubbles mixed with the ink are solved. It is therefore possible to shuttle the ink jet printing head in the same way as a thermal printing head.

(2) If the shuttling period is further shortened and the shuttling frequency is lowered to such a degree as to be below the lower limit of the audible frequency range, it is possible to greatly decrease the noise caused by the printing operation.

(3) Printing at a high density is realized even by using an ink jet printing head having a comparatively low printing density, which is cheap and is produced at a high productivity.

(4) Even if a nozzle is clogged, dot omissions are not caused in a whole column corresponding to the dots which are assigned to the blocked nozzle unlike in the case of directly applying the conventional method of driving a thermal printing head to an ink jet printing head, so that the blank portion is inconspicuous.

(5) Since it is possible to print at a high density by using an ink jet printing head having a low printing density, it is possible to enlarge each ink path, thereby enhancing the ink supply reliability.

(6) Since the (head 1) shuttling movement is smooth, it is further easy to prevent the disturbance of the printing operation and an ink jetting error due to bubbles mixed with the ink.

(7) Since the paper feeding operation is initiated after the ink adheres to the printing paper, high-quality dot printing which is free from shear is realized.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An ink jet printer for printing on a printing medium comprising:

a head having nozzles, each of said nozzles assigned to print a number of dots by jetting ink through said nozzles;

first moving means for relatively moving said head along a direction of a printing line on said printing medium by an amount corresponding to said number of dots;

printing control means for controlling the jetting of ink a by said nozzles on the basis of a printing pattern to print supplied to said control means during movement of said head by said first moving means;

second moving means for relatively moving said head in a direction orthogonal to said printing line on said printing medium by a predetermined amount;

first movement control means for alternately repeating the movement by said first moving means and the movement by said second moving means a predetermined number of times; and second movement control means for reversing the direction of movement by said first moving means after said predetermined number of times by said first movement control means, and thereafter alternately repeating the movement by said first moving means and the movement by said second moving means.

2. An ink jet printer according to claim 1, further comprising third movement control means for executing the movement by said second moving means at a time when a movement of said first moving means is finished and after a time required for said ink to adhere to said printing medium has elapsed from the time when said ink is jetted.

3. An ink jet printer according to claim 1, wherein a period for reversing direction of movement by said first moving means is longer than an upper limit of a period of audible sound.

4. A method of driving an ink jet printing head, said printing head having nozzles, the method comprising the steps of:

(a) printing on one line on paper while moving a printing head dot by dot in one horizontal direction by an amount corresponding to dots assigned to each nozzle;

(b) repeating step (a) at least once;

(c) printing on one line on paper while moving the printing head dot by dot in a direction opposite to the direction of step (a) by an amount the same as at step (a);

(d) repeating step (c) the same number of times as step (b); and (e) finishing the shuttling movement of the printing head when the printing head is returned to the printing starting point.

5. An ink jet printer for printing on a printing medium, said medium having a print width, the printer comprising:

a head having nozzles, each of said nozzles assigned to print a number of dots by jetting ink through said nozzles;

first moving means for relatively moving the head along a printing line on the printing medium in a first direction by an amount corresponding to the number of dots;

means for controlling the jetting of ink by the nozzles on the basis of a printing pattern, supplied to said means for controlling, during movement of said printing a head by the first moving means;

second moving means for relatively moving the head in a direction orthogonal to the printing line on the printing medium by a predetermined amount; and movement control means for alternately repeating the movement by the first moving means and the movement by the second moving means a predetermined number of times, after said predetermined number of times said printing head is moved in a second direction opposite the first direction.

6. The printer of claim 5, wherein the print width is a, the number of dots per nozzle is d, and the number of times that the first movement control operates is n, wherein the number of nozzles is $a/d+(n-1)$.

7. The printer of claim 5, wherein the movement control means moves the head at least four times before the head is moved in the second direction relative to the print line.

8. The printer of claim 5, wherein the head prints in the first direction for a sufficient period before the head is moved in a second direction, the period being sufficiently long so that the frequency is lower than about 20 Hz.

9. An ink jet printer for printing on a printing medium comprising:

a head having nozzles through which ink is jetted including a first nozzle;

first means for moving the head relative to the printing medium along a first printing line in a first direction so that the first nozzle prints along a first range of positions while moving the head in a first direction relative to the printing medium;

second means for moving the head in a direction orthogonal to the printing line relative to the printing medium to a second print line; and control means for controlling the first means for moving and the second means for moving so that after the second means for moving moves the head to a second print line, the first means for moving moves the head in the first direction so that the head prints along a second range of positions, wherein the first range of positions and the second range of positions are non-overlapping with respect to the direction orthogonal to the printing line.

* * * * *